US010145433B2

(12) United States Patent
Jackson

(10) Patent No.: US 10,145,433 B2
(45) Date of Patent: Dec. 4, 2018

(54) DISC BRAKE CALIPER

(71) Applicant: MEI BRAKES LIMITED, Sheffield (GB)

(72) Inventor: Jonathan Leslie Christopher Jackson, Herefordshire (GB)

(73) Assignee: MEI BRAKES LIMITED, Sheffield (GB)

( * ) Notice: Subject to any disclaimer, the term of this patent is extended or adjusted under 35 U.S.C. 154(b) by 0 days.

(21) Appl. No.: 15/115,429

(22) PCT Filed: Jan. 30, 2015

(86) PCT No.: PCT/GB2015/050224
§ 371 (c)(1),
(2) Date: Jul. 29, 2016

(87) PCT Pub. No.: WO2015/114353
PCT Pub. Date: Aug. 6, 2015

(65) Prior Publication Data
US 2017/0184167 A1 Jun. 29, 2017

(30) Foreign Application Priority Data
Jan. 30, 2014 (GB) .................................. 1401614.1

(51) Int. Cl.
*F16D 65/56* (2006.01)
*F16D 65/58* (2006.01)
(Continued)

(52) U.S. Cl.
CPC ........... *F16D 65/58* (2013.01); *F16D 55/226* (2013.01); *F16D 65/18* (2013.01); *F16D 65/183* (2013.01);
(Continued)

(58) Field of Classification Search
CPC ...... F16D 55/226; F16D 65/568; F16D 65/58; F16D 65/183; F16D 2055/0037; F16D 2121/14; F16D 2125/22; F16D 2125/585
(Continued)

(56) References Cited

U.S. PATENT DOCUMENTS 5,833,035 A * 11/1998 Severinsson ............ F16D 65/18
188/71.9
5,848,673 A * 12/1998 Strauss .................. F16D 65/568
188/1.11 L
(Continued)

FOREIGN PATENT DOCUMENTS

DE 102009023416 A1 * 12/2010 ......... F16D 55/2255
EP 2538104 A2 12/2012
(Continued)

OTHER PUBLICATIONS

Patent Cooperation Treaty, International Searching Authority, International Search Report, PCT/GB2015/050224, dated May 4, 2015.
(Continued)

*Primary Examiner* — Thomas W Irvin
(74) *Attorney, Agent, or Firm* — Reichel Stohry LLP; Mark C. Reichel; Natalie J. Dean

(57) ABSTRACT

A disc brake (10) of the type including a pivoting lever having eccentric journals which act on a pair of tappets is disclosed. The tappets are adjusted in length by rotation, and each tappet has a tappet gear (22). A centrally located intermediate gear (24) is provided between the tappet gears to form a gear train, synchronizing the rotation of the two tappets and therefore ensuring that they remain the same length. The centrally located intermediate gear (24) includes a socket (26) for receiving a centrally located adjuster. The adjuster may be installed and removed from the disc brake through an aperture at the rear of the brake caliper, without any substantial disassembly of the brake and without de-
(Continued)

synchronizing the tappets or even interrupting the gear train between the tappets.

16 Claims, 3 Drawing Sheets

(51) Int. Cl.
| | |
|---|---|
| *F16D 55/226* | (2006.01) |
| *F16D 65/18* | (2006.01) |
| *F16D 55/00* | (2006.01) |
| *F16D 121/14* | (2012.01) |
| *F16D 125/26* | (2012.01) |
| *F16D 125/32* | (2012.01) |
| *F16D 125/22* | (2012.01) |
| *F16D 125/58* | (2012.01) |

(52) U.S. Cl.
CPC .... *F16D 65/568* (2013.01); *F16D 2055/0037* (2013.01); *F16D 2121/14* (2013.01); *F16D 2125/22* (2013.01); *F16D 2125/26* (2013.01); *F16D 2125/32* (2013.01); *F16D 2125/585* (2013.01); *F16D 2250/0084* (2013.01)

(58) Field of Classification Search
USPC ...................................... 188/71.7, 71.8, 71.9
See application file for complete search history.

(56) References Cited

U.S. PATENT DOCUMENTS

| | | | | |
|---|---|---|---|---|
| 6,585,086 | B2 * | 7/2003 | Ortegren | F16D 65/183 188/71.1 |
| 6,659,235 | B2 * | 12/2003 | Ortegren | F16D 65/183 188/71.1 |
| 6,817,452 | B2 * | 11/2004 | Heinlein | F16D 65/183 188/72.9 |
| 6,923,297 | B1 * | 8/2005 | Thomas | F16D 65/00 188/196 D |
| 6,962,244 | B2 * | 11/2005 | Ortegren | F16D 65/183 188/106 F |
| 7,891,470 | B2 * | 2/2011 | Roberts | F16J 1/008 188/72.9 |
| 8,590,675 | B2 * | 11/2013 | Jungmann | F16D 65/18 188/71.9 |
| 8,678,145 | B2 * | 3/2014 | Camilo-Martinez | F16D 65/183 188/71.8 |
| 8,893,862 | B2 * | 11/2014 | Malki | F16D 65/568 188/196 D |
| 9,004,238 | B2 * | 4/2015 | Miller | F16D 65/18 188/71.9 |
| 9,062,727 | B2 * | 6/2015 | Thomas | F16D 65/183 |
| 9,500,240 | B2 * | 11/2016 | Fuse | F16D 55/226 |
| 9,568,060 | B2 * | 2/2017 | Malki | F16D 65/568 |
| 2001/0030090 | A1 * | 10/2001 | Thomas | F16D 55/227 188/72.9 |
| 2005/0045434 | A1 * | 3/2005 | Holl | F16D 55/227 188/72.1 |
| 2013/0008749 | A1 * | 1/2013 | Sandberg | F16D 55/227 188/71.8 |
| 2014/0090933 | A1 * | 4/2014 | Sakashita | F16D 55/226 188/72.4 |
| 2016/0327109 | A1 * | 11/2016 | Staahl | F16D 55/2255 |
| 2016/0369858 | A1 * | 12/2016 | Jackson | F16D 55/2255 |
| 2017/0159732 | A1 * | 6/2017 | Klingner | F16D 55/226 |

FOREIGN PATENT DOCUMENTS

| | | |
|---|---|---|
| EP | 2538105 A2 | 12/2012 |
| WO | 2013/143988 A1 | 10/2013 |
| WO | 2013/143996 A1 | 10/2013 |
| WO | 2014/041161 A1 | 3/2014 |

OTHER PUBLICATIONS

Patent Cooperation Treaty, International Searching Authority, Written Opinion of the International Searching Authority, PCT/GB2015/050224, dated May 4, 2015.
UK Intellectual Property Office, Patents Act 1977: Search Report Under Section 17, GB 1401614.1, dated Aug. 22, 2014.
UK Intellectual Property Office, Patents Act 1977: Combined Search and Examination Report Under Sections 17 & 18(3), GB 1401614.1, dated Aug. 26, 2014.

* cited by examiner

DISC BRAKE CALIPER

PRIORITY

The present application is related to, and claims the priority benefit of, and is a 35 U.S.C. 371 national stage application of, International Patent Application Serial No. PCT/GB2015/050224, filed Jan. 30, 2015, which is related to, and claims the priority benefit of, Great Britain Patent Application Serial No. 1401614.1, filed Jan. 30, 2014. The contents of each of these applications are hereby incorporated by reference in their entirety into this disclosure.

TECHNICAL FIELD

The present invention relates to a disc brake caliper, particularly but not exclusively an air-disc brake caliper for road vehicles.

BACKGROUND TO THE INVENTION

Brakes for road vehicles, in particular large road vehicles such as lorries and coaches which have air brakes, are either drum brakes or disc brakes. Disc brakes provide generally better performance, because they are less prone to overheating which causes brake fade. Disc brakes also do not have the self-servo effect associated with drum brakes, thus giving the driver better control when braking. For these reasons, disc brakes have more stable performance.

In some markets, however, drum brakes are still preferred despite the accepted advantages of disc brakes. One reason for this is that drum brakes are mechanically simpler, and are generally easier to service without specialist equipment.

In a typical disc brake, there is an application unit within the disc brake caliper which provides a load train to transmit force from the actuating cylinder of the compressed air system to push the brake pad against the disc. The application unit typically includes a pair of tappets at the end of the load train, and a pivoting lever which is pushed by the actuating cylinder at one end, and which pushes against the tappets at the other end. In some designs, for example as described in WO2013143988, the pivoting lever acts indirectly on the tappets via a bridge, and in other designs, for example see EP1000263, the pivoting lever acts directly on the tappets. In both alternatives, the pivoting lever is usually of a "wishbone" shape, so that at the tappet end it can act on each tappet, or act on the bridge with two points of contact.

Part of the complexity which makes a disc brake more difficult to service comes from the way in which the brake adjusts to take up wear in the brake pad. Each tappet is made in two screw-threaded tappet sections, so that each tappet is adjustable in length by rotating one tappet section with respect the other tappet section. An adjuster is provided, the simplest mechanical type including a one-way sprag clutch and an over-torque clutch. The adjuster is actuated on brake application, if the running clearance between the disc and the pad is greater than a certain pre-set amount. The adjuster, when actuated, provides rotation. The over-torque clutch ensures that the brake is not over-adjusted when the brake pad, or caliper housing, elastically deforms during high-load applications, and the sprag clutch slips on the off-stroke in order that adjustment is not retracted. The tappets are rotatably linked, for example by a chain, timing belt or gear train, to the adjuster output shaft and to each other. In this way, the tappets rotate slightly when adjustment is required. This increases the length of the tappets slightly each time, so that the running clearance (the distance between the brake pad and the brake disc when the brake is not being applied) is maintained as the brake pad wears over time.

If the brake needs to be disassembled to replace a worn part, the adjuster usually needs to be taken out. In most current designs this cannot be done without interrupting the rotational link between the two tappets. If the rotational link is interrupted, the tappets may become set to different lengths, and if this is not corrected before reassembly the imbalanced application of the pad to the disc will result in potentially dangerous braking problems. Re-synchronizing the tappets is often a difficult procedure which requires specialist tools.

In some known designs, for example in WO2013079376, an adjuster is provided axially in-line with one of the tappets, and is connected to the tappet independently of the rotational linkage. Whilst this does mean that the adjuster can be removed without de-synchronizing the tappets, in practice it is not possible to remove an adjuster at all from this position with the application unit still installed within the caliper. Although a single unit including the two synchronized tappets can be separated from the adjuster, this is only possible by substantially disassembling the caliper and removing the unit.

In some older designs, for example in WO9701045, an adjuster is provided to the side of one of the tappets, between the tappet and the side of the caliper rather than between the tappets. In these designs, the adjuster can be removed without de-synchronising the tappets, but in order to do this a stressed rear cover plate has to be employed and this must be removed together with the operating shaft, which again amounts to a substantial disassembly of the caliper and removal from the vehicle.

More advanced adjusters than the simple mechanical type are becoming more popular. Electric adjusters which actively control the running clearance of the pad relative to the disc can provide for closer running clearance, which reduces the brake application time and therefore the stopping distance of the vehicle whilst ensuring that the brakes do not "run hot", which reduces the efficiency of the vehicle and also the performance of the brakes. However, for the above mentioned reasons it is difficult to replace one type of adjuster with another type, because replacement of the adjuster requires substantial disassembly of the whole brake.

It is an object of the invention to provide a disc brake caliper which is easier to service.

STATEMENT OF INVENTION

According to the present invention, there is provided a brake caliper, including a brake caliper housing and a brake application unit disposed within the caliper housing, the application unit comprising a pivoting lever, first and second tappets for transmitting force from the pivoting lever to a brake pad, the tappets each being formed in two threaded tappet sections and being adjustable in length by means of rotating one tappet section relative to the other tappet section, and a gear train including first and second respective tappet gears for synchronising rotational movement of the first and second tappets, an intermediate coupling gear disposed substantially centrally between the first and second tappet gears as part of the gear train, the coupling gear including means for removably receiving an output shaft of a substantially centrally disposed adjuster and for transmitting rotation from the adjuster to the first and second tappet gears, and the brake caliper housing being provided with an aperture in a rear wall, for allowing removal and replacement of the adjuster.

The intermediate coupling gear allows a substantially centrally located adjuster to be withdrawn from the rest of the assembly, without de-synchronizing the tappets. Because the adjuster is central, it can be withdrawn through the clearance in a typical wishbone pivoting lever, and out of an appropriately located opening in the rear of the caliper.

The adjuster can be withdrawn for inspection, service, or replacement. A simple mechanical adjuster could be replaced with an electric adjuster for active clearance control, without requiring any substantial disassembly of the brake or resetting of the synchronization between the tappets.

A further advantage is in initial assembly of the application unit, or reassembly if the application unit has had to be disassembled for other reasons. Synchronization of the tappets, where it is required, is relatively straightforward because the pistons can be set to the same length on a jig, and the intermediate coupling can then be installed to keep the tappets synchronized. The adjuster can be installed later. This provides for a simplified assembly procedure which does not require complex equipment, and gives flexibility in terms of the point at which the adjuster is fitted. The adjuster may be fitted immediately after synchronizing the tappets, or at a later stage if convenient.

The above mentioned advantages mean that the product incorporating the invention can be supplied more easily as a modular kit, for CKD assembly for export markets and local customisation by OEMs. For example, some OEM customers may wish to include an electric adjuster as an option.

The invention is particularly suitable for use in air disc brakes, but may also be incorporated into hydraulically, electrically or mechanically actuated disc brakes. Brakes incorporating the invention may be fitted particularly to heavy road vehicles such as lorries and coaches, but may also be used on railway vehicles.

Throughout this description, the invention is described with reference to a sliding caliper design, the side of the caliper which is adjacent the brake disc will be referred to as the front of the caliper, and the side of the caliper which faces away from the disc will be referred to as the rear of the caliper. However, it will be appreciated that the invention can also be incorporated into a fixed caliper with a brake application unit on either side.

The pivoting lever may include an eccentric journal, and preferably includes an eccentric journal for each tappet, the journals operating directly on each tappet, rather than indirectly via a bridge. The pivoting lever may be a wishbone-shaped, in other words, substantially Y-shaped having a central arm providing a bearing surface for an actuating cylinder, and a pair of arms forming a fork, on the ends of which the eccentric journals are provided.

Eccentric journals which act directly on the tappets via a cylindrical roller are advantageous, because it allows for the arcuate movement in the eccentric to be translated into movement directly forwards in the tappets, with minimal sideways or vertical components. This allows the tappets to be mounted in a fixed bearing within the cover plate, and ensures that the force on the pad is equally applied by both tappets and remains perpendicular to the pad. In alternative designs, where the tappets are not fixed in an axial sliding bearing, the resulting sideways and arcuate movement of the tappets can result in a tapered wear pattern on the brake pads, which reduces braking performance. Brake application which is completely perpendicular to the disc results in the best pressure distribution and heat distribution between rotor and pad.

Eccentric journals which act directly on the tappets of twin piston brakes are also advantageous in that the reaction force into the back of the housing is applied closer to each outer corner of the brake caliper housing, which results in less deflection of the housing when compared to designs which have their operating shaft reaction closer to the centre of the brake housing. This allows for better brake performance.

Since the adjuster is central, the pivoting lever acting directly on the tappets is not an obstruction to installation and removal of the adjuster, and in fact a directly acting pivoting lever is of a more widely spread-out wishbone shape than known "indirect" designs, allowing a greater clearance for the adjuster between the arms of the wishbone.

The coupling gear may be formed as a cogwheel and a socket. The socket may include splines for receiving a cogwheel on an output shaft of an adjuster, and for rotatably coupling the output shaft with the socket and hence the cogwheel and the rest of the gear train. A socket with splines provides an easily removable and yet secure coupling.

The brake caliper housing may be a single- or two-piece cast housing. In a preferred embodiment, the application unit is installed in a two-piece housing which has an opening in the disc side to assemble the application unit inside the housing, although other configurations are possible and will be familiar to the skilled reader.

A housing with an opening in the disc side for assembly is advantageous because it allows for easy assembly, whilst providing for a rear section of the caliper which is largely closed and is therefore very strong. The opening in the disc side may be closed by a cover plate, and the cover plate may include a pair of protrusions extending rearwardly into the caliper housing. The protrusions may be hollow cylinders, and provide a guide within which the tappets may slide.

A disc brake which is assembled from the disc side, but which has an adjuster which is removable from the rear (i.e. the side facing away from the disc) provides for all the advantages of disc-side assembly, whilst at the same time providing an adjuster which is replaceable without disassembling the brake.

DESCRIPTION OF THE DRAWINGS

In order to provide a better understanding of the present invention, a preferred embodiment will now be described, by way of example only, with reference to the drawings, in which.

DESCRIPTION OF THE PREFERRED EMBODIMENT

Figure 1:
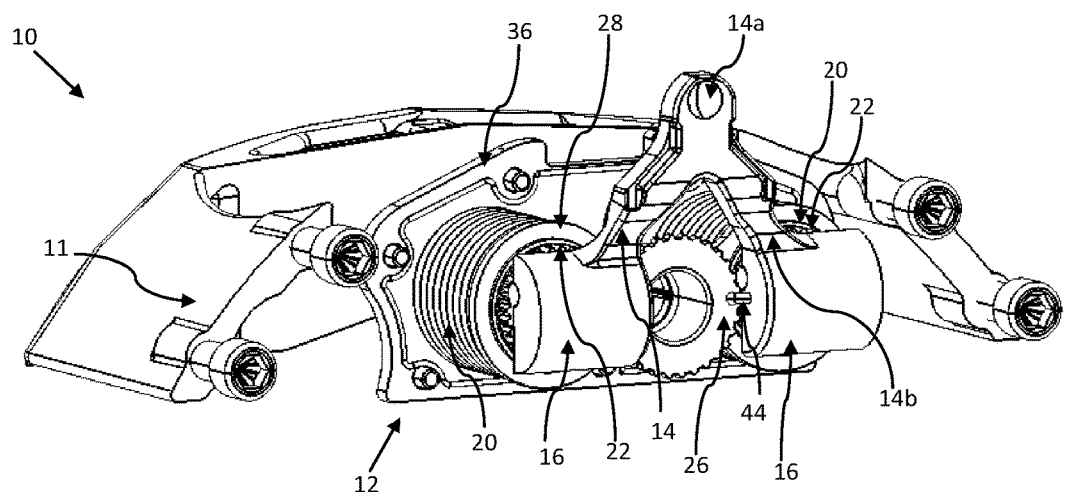
FIG. 1 shows a perspective view of a brake caliper including the application unit of the invention, the rear part of the housing being cut away to show the application unit which includes a pivoting lever.

Referring firstly to FIG. 1, a brake caliper is shown generally at 10. In this embodiment, the caliper housing is formed in two parts, with a front section 11 and a rear section (13). The rear section is cut away in FIG. 1 to reveal a brake application unit 12 which is housed within the rear section (13). The rear section (13) of the brake caliper has an opening in its front surface, which is closed by a cover plate 36. It will be understood that alternative embodiments of the invention may include single-piece brake housings.

Figure 4:
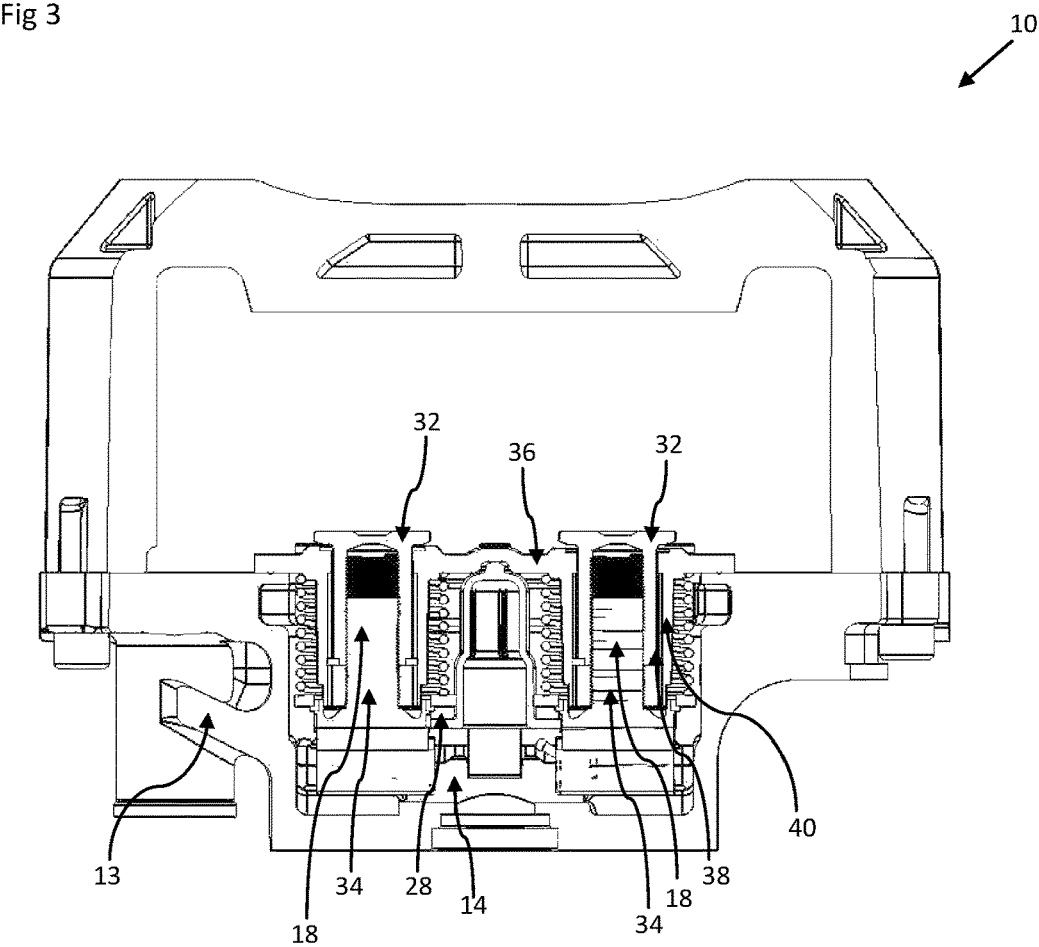
FIG. 4 shows a cross-section through the brake caliper of FIG. 1.
Figure 5:
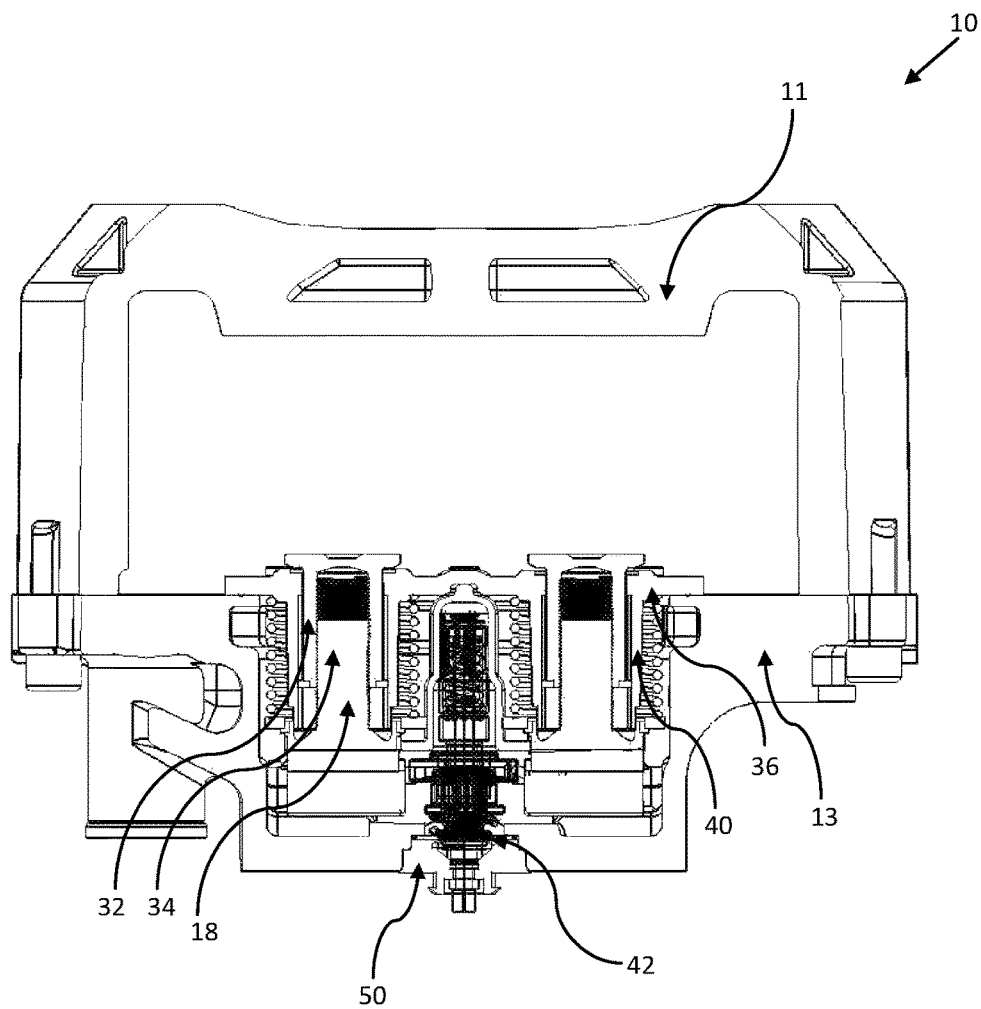
FIG. 5 shows a cross-section through the brake caliper, as in FIG. 4, but showing an adjuster and plug installed.

As best seen in FIGS. 4 and 5, the cover plate 36 includes rearward protrusions which form hollow cylinders 40, extending into the rear section 13 of the housing. A pair of tappets 18 slide within the cylinders 40. It is the tappets (18) which push onto the brake lining, and in turn the brake pad. Each tappet 18 is formed as a front tappet section 32 and a rear tappet section 34. The rear tappet section 34 is rotatable within the front tappet section 32, and there is a screw thread between the sections 32, 34. In this way, each tappet 18 may be adjusted in length by rotating the rear tappet section 34, and holding the front tappet section 32 against rotation. Each front tappet section 32 is held to its associated hollow cylinder 40 by a locking ring 38. Therefore, rotating the rear tappet sections changes the overall length of the tappets.

The purpose of the application unit 12 is to transmit force from an actuating cylinder of a braking system (typically this is a hydraulic or pneumatic system) to the tappets and then to the brake lining and brake pad.

The application unit 12 includes an operating shaft 14 which is in the form of a wishbone-shaped pivoting lever, and has at one end 14a a bearing surface which in use is pushed by an actuating cylinder, and at the other end 15b a pair of eccentric journals 16 which in use amplify the force from the actuating cylinder and transfer it to tappets (18).

Figure 2:
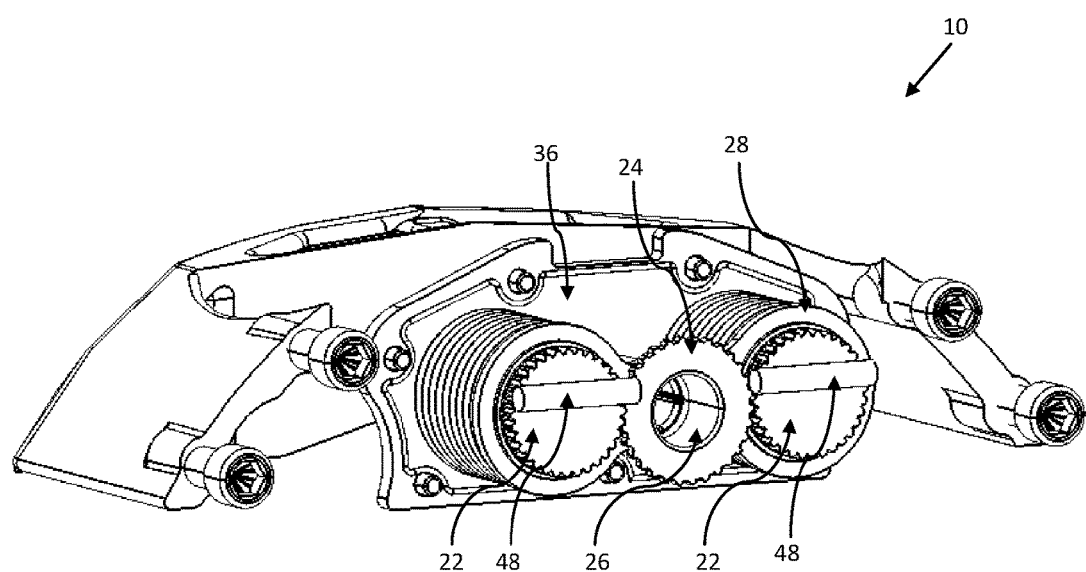
FIG. 2 shows the application unit of FIG. 1, without the pivoting lever.

FIG. 2 shows the same view as FIG. 1, but without the pivoting lever 14. The adjustment and synchronization mechanism can therefore be clearly seen in this Figure. Tappet gears 22 are provided on the rear end of each tappet. Rotating these gears rotates one tappet section 34 with respect to the other tappet section 32, therefore changing the length of the tappet 18. The threads of both tappets are of the same pitch, so that for a given rotation the front tappet sections advance the same distance. A gear train is provided between the tappet gears 22, which in this embodiment comprises a single intermediate gear 24, which is formed integrally as part of an intermediate coupling 26. It will be understood that the intermediate gear may be in an alternative form, for example it may be in two pieces.

Figure 3:
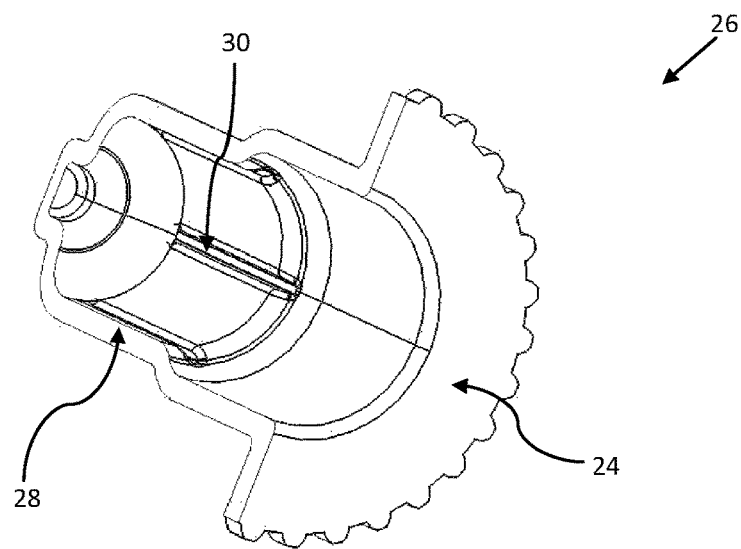
FIG. 3 shows a perspective cut-away view of an intermediate coupling, which forms part of the application unit of FIG. 1.

The intermediate coupling 26 is more clearly shown in the cutaway view of FIG. 3, and is generally in the form of an elongate socket with the intermediate gear 24 extending from and surrounding an edge of the open end of the socket. A portion of the socket is provided with splines 30, which run along the interior surface of the socket, substantially parallel to its longitudinal axis.

An apertured plate 28 is provided between the tappets 18 and the tappet gears 22. The plate 28 has three substantially circular apertures, and the tappet gears 22 connect to the tappets 28 through the outer two of the three apertures. The central aperture of the three is sized to receive the intermediate coupling 26. The plate 28 provides a bearing surface for the tappet gears 22 and the gear train, which in this embodiment is just the intermediate gear 24 of the intermediate coupling 26.

Return springs 20 are provided surrounding the cylinders 40, between the cover plate 36 and the apertured plate 28. The return springs 20 urge the apertured plate 28 away from the cover plate 36, and hence force the tappets 18 rearwardly into the brake housing. When the brake is applied, the actuating cylinder pushes the bearing surface 14a of the pivoting lever 14 forwards, towards the disc. The lever 14 pivots, and the eccentric journals 16 rotate in seats which formed into the interior of the rear hosing section 13 of the caliper, and push on both tappets 18 together. Tappet bearings 48 are provided between the journals 16 and tappet gears 22 and are in the form of cylinders, the longitudinal axes of which are perpendicular to the tappets 18. The bearings 48 can slide or roll on the flat surface of the tappet gears 22, so that the bearings 48 remain substantially horizontal as the tappets 18 rotate to keep the brake adjusted. The tappets 18, as well as the gear train 22, 26 and apertured plate 28, all move forwards against the springs 20, pushing the brake pad against the brake disc. When the brake is released, the springs 20 return the tappets 18, gear train 22, 26 and apertured plate 28 to their rearward rest position.

The overall arrangement of the tappets and associated gear train is shown in FIG. 4 and FIG. 5. FIG. 4 shows a cross section through the brake caliper 10 with no adjuster fitted, and FIG. 5 shows the same cross section with an adjuster 42 fitted. The adjuster is of a design which will be familiar to the person skilled in the art. In this embodiment a simple mechanical adjuster is shown, including a one-way sprag clutch and an over-torque clutch. An operating pin 44 (seen in FIG. 1) on one of the eccentric journals 16 of the pivoting lever 14 engages with a toothed wheel of the adjuster. The pin can move to a certain degree with respect to the journal, for example, 1 mm of freedom may be provided. This defines the running clearance of the brake. If the journal moves further than that, the operating pin 44 turns the toothed wheel through a few degrees. This rotation is transmitted to the intermediate coupling 26, via the one-way clutch and over-torque clutch of the adjuster 42. In this way, the tappets 18 are extended slightly with each application of the brake. The one-way clutch means that the tappets 18 will only ever be lengthened, never shortened, on brake application, and the over-torque clutch prevents overadjustment during very heavy braking, when the brake pads, caliper housing and other brake components may exhibit elastic behaviour.

Figure 6:
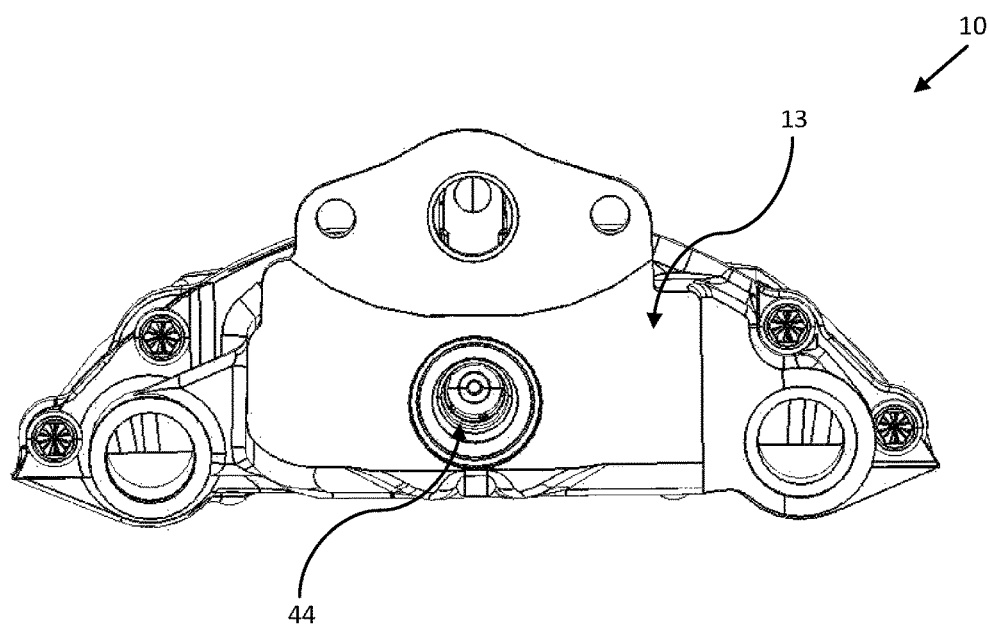
FIG. 6 is a rear plan view of the brake caliper of FIG. 1, without the housing cut away.

The adjuster 42 can easily be removed from the application unit 12, without disturbing the synchronization between the tappets 18. If the adjuster 42 is removed, the intermediate coupling 26 remains in place, so that the gear train is not interrupted. FIG. 6 shows a rear view of the brake caliper 10, including the rear section 13 of the housing. The rear housing section 13 has an aperture 44 in its rear face, which allows the adjuster to be completely withdrawn without any disassembly of the brake. A plug 50 is provided to hold the adjuster in place and to close the aperture in the rear wall of the caliper. The plug can be removed to release the adjuster 42 and remove it from the brake, and includes a bearing formation for receiving and supporting the back end of the adjuster 42.

The plug may be a press fit, screw fit, or any other type of plug.

The adjuster can be removed from the brake without any substantial disassembly, and without de-synchronizing the tappets. This is particularly surprising bearing in mind that this is a disc brake which is assembled through an opening in the caliper on this disc side, and provides for a significant advantage. For example, it may be desirable to supply brakes without an installed adjuster 42, so that the OEM customer has a choice of adjuster, depending on specific requirements. For example, electric adjusters may be provided as an option on particular vehicles, and vehicles with simple mechanical adjusters can be upgraded to use electric adjusters without disassembly of the brake. Electric adjusters allow for active clearance control, and can provide for better overall braking performance.

In the brake application unit described, the eccentric journals on the pivoting lever operate directly on the tappets, ensuring that brake application is even and is fully perpendicular to the brake disc. The central position of the adjuster allows for this, and the intermediate coupling allows the central adjuster to be easily replaced. A further advantage of the central adjuster is that the tappets are rotated (and therefore extended) by substantially equal amounts. In any side adjuster design, backlash in the gear train will lead to slight differences in length between the tappets, resulting in uneven brake application.

The embodiments described above are provided by way of example only, and various changes and modifications will be apparent to persons skilled in the art without departing from the scope of the present invention as defined by the appended claims.

The invention claimed is:

1. A brake caliper, including a brake caliper housing and a brake application unit disposed within the caliper housing,
   the application unit comprising a pivoting lever, first and second tappets for transmitting force from the pivoting lever to a brake pad, the tappets each being formed in two threaded tappet sections and being adjustable in length by means of rotating one tappet section relative to the other tappet section, and a gear train including first and second respective tappet gears for synchronising rotational movement of the first and second tappets, an intermediate coupling gear disposed substantially centrally between the first and second tappet gears as part of the gear train, the coupling gear including means for removably receiving an output shaft of a substantially centrally disposed adjuster and for transmitting rotation from the adjuster to the first and second tappet gears, and
   the brake caliper housing being provided with an aperture in a rear wall, for allowing removal and replacement of the adjuster;
   in which a plug is provided for closing the aperture in the rear wall of the caliper housing, and in which the plug includes a bearing formation for supporting a rotatable shaft of the adjuster.

2. A brake caliper as claimed in claim 1, in which the adjuster can be removed without desynchronizing the tappets.

3. A disc brake for a vehicle, including a brake caliper as claimed in claim 1, a brake disc, and a brake pad.

4. A brake caliper as claimed in claim 1, in which the pivoting lever includes an eccentric journal.

5. A brake caliper as claimed in claim 4, in which the pivoting lever includes an eccentric journal associated with each tappet.

6. A brake caliper as claimed in claim 4, in which the eccentric journals are disposed substantially axially in-line with the tappets.

7. A brake caliper as claimed in claim 6, in which the eccentric journals act directly on the tappets.

8. A brake caliper as claimed in claim 1, in which the pivoting lever is substantially wishbone-shaped.

9. A brake caliper as claimed in claim 8, in which the arms of the wishbone-shaped pivoting lever are sufficiently widely spaced to allow an adjuster to be introduced into the intermediate coupling, between the arms of the pivoting lever.

10. A brake caliper as claimed in claim 1, in which the intermediate coupling gear includes a socket.

11. The brake caliper as claimed in claim 10, in which the socket includes interior splines for receiving a cogwheel on an output shaft of an adjuster.

12. A brake caliper as claimed in claim 1, in which the brake caliper housing is formed as a front piece and a rear piece.

13. A brake caliper as claimed in claim 1, in which an opening is provided in the front side of the rear piece of the housing for allowing assembly of the application unit.

14. A brake caliper as claimed in claim 13, in which the opening is closed by a cover plate.

15. A brake caliper as claimed in claim 14, in which hollow sleeves extend rearwardly from the cover plate, within which the tappets may slide.

16. A brake caliper as claimed in claim 1, in combination with a replaceable adjuster.

* * * * *